Patented Feb. 4, 1936

2,029,894

UNITED STATES PATENT OFFICE 2,029,894

MOLDING COMPOSITION

Kurt Ripper, Vienna, Austria

No Drawing. Original application March 5, 1931, Serial No. 520,478. Divided and this application September 17, 1932, Serial No. 633,682. In Austria December 15, 1930

10 Claims. (Cl. 106—22)

My invention relates to a molding powder or composition for die casting, which molding powder or composition contains as a binding agent condensation products of thiourea or a mixture of thiourea and urea, with formaldehyde. This application is a division of my pending application Serial No. 520,478, filed March 5, 1931, which covers the broader aspects of the present divisional application.

The principal object of the present invention is to render available the means to produce a molding powder or composition for die casting of this material which shows an accurately regulable and uniform state of polymerization, and shall, owing to this, materially facilitate the manufacture of molded products.

The process of making the above mentioned condensation products which are exceedingly well suited for being used as binding agent for molding powders containing fibrous materials and of such compositions for die casting, consists essentially in reacting without applying heat with less than 2 mols, preferably 1½ mols, of formaldehyde upon 1 mol of thiourea or of a mixture of thiourea and urea at a higher hydrogen ion concentration than corresponds to the value pH=5, consequently at a pH having a numerical value of less than 5. Preferably the hydrogen ion concentration is adjusted so as to correspond to the value pH=3. Hydrogen-ion concentration is also sometimes expressed as $C_H$, using numbers with minus exponents to indicate the actual concentration of hydrogen ions in the solution or aqueous medium. The relationship between $C_H$ and pH is as follows:

$$pH = \log_{10} 1/C_H$$

Hence $C_H = 10^{-5}$ is expressive of the same hydrogen-ion concentration as pH=5; and $C_H = 10^{-3}$ is equivalent to pH=3.

By reacting in the cold with formaldehyde upon urea in an aqueous medium having a higher acidity than pH 5, a white insoluble product serving no useful purpose is generated (Cf. e. g. Beilstein-Prager-Jacobson, "Handbuch der organischen Chemie", 3rd 1921, Tome IV page 48). Thus for instance a solution of 60 parts by weight (1 mol) of urea in 150 parts by weight of an aqueous formaldehyde solution containing 30% by weight (1½ mols) of formaldehyde, which by the addition of phosphoric acid had been brought to a hydrogen ion concentration corresponding to a pH of about 3, will pass at room temperature (about 20° C.) within a few minutes into a white crumbly cake unfit for anything. But the reaction will turn out quite differently, if the urea is without any other modification of the operating conditions entirely or partly replaced by thiourea. If for instance in the above specified starting mixture half of the 60 parts by weight of the urea, that is 30 parts by weight or ½ mol, is replaced by 38 parts by weight (½ mol) of thiourea, at the temperature of 20° C. a solution results, which remains clear as water for hours and with an addition of organic solvents such as for instance ethyl alcohol, will not show the least turbidity even after having stood at rest for 24 hours.

As is well known, the course of the condensation of urea with formaldehyde when carefully operating in a neutral or alkaline solution can be interrupted at a stage, in which the simple chemical compounds methylol urea and dimethylol urea (or mixtures of these compounds) are formed, which do not yet show any tendency to polymerization, but are capable of further condensation. Now I have succeeded in breaking the continuity of the reaction in the condensation of thiourea (or of mixtures of thiourea and urea) with formaldehyde, by operating in an acid solution without heating. By this way of proceeding first of all true solutions of simple chemical compounds are produced, whereas the reaction between urea and formaldehyde, as has been mentioned above, will under the same conditions proceed interruption up to the formation of useless insoluble masses. In the acid solution of the firstly generated simple thiourea (or thiourea and urea) formaldehyde condensation products the formation of complex compounds capable of polymerization and a slowly progressing polymerization will take place, during which the condensation products are, by growing of the molecules, successively transformed into the colloidal state. These reaction products can therefore, by systematically conducting the reaction, be brought into a state of polymerization which is adjusted to convenience, that is to say lower or higher, but in any case uniform. In addition thereto the colloids finally formed by this process are hydrophobe, so that they will give off the water easily and completely.

By other workers the interaction of thiourea and formaldehyde, when effected in an acid medium and without applying heat, has been found to yield a crystalline condensation product of the composition $C_2H_4N_2S$ which is said to be insoluble in all solvents and to be decomposed, with browning and effervescence, at about 202–203°. This compound is a dimethylene-thiocarbamide which, does not have the character of artificial resins and does not pass over into such resins when being heated, but on the contrary is decomposed by heat with or without the action of pressure, and therefore cannot be used for the production of artificial masses. It was learned from experimental work that the reaction takes this turn when the hydrogen ion concentration exceeds a certain limit, but this limit depends also on the proportion of thiourea present when the starting material is a mixture of urea and thiourea, and on the temperature. Consequently only the rule may be given concerning the hydrogen ion concentration fit for the present process, that the condensation has to be effected at a hydrogen-ion concentration greater than pH 5 and that there is an upper limit giving rise to the generation of the said methylene-compound, and that in the present process the hydrogen concentration has to be adjusted so, as to lie between these two limits.

For manufacturing molding compositions the fibres are with or without the addition of other fillers, dyes or pigments mixed with the solution, whereafter the mixture is allowed to rest at ordinary room temperature until at first it will become air-dry and thereupon the condensation product contained therein will have been brought into a conveniently high but uniform state of polymerization. This finish of the polymerization process may be assisted by being effected at elevated temperature. In doing so it is, particularly for producing quick molding compositions, advisable to moisten the mixture in the last state of warming and thus to ensure that the small residue of water, thanks to which the molding composition is capable of flowing in the hot press, is still present, when the desired degree of polymerization is attained. It is, however, not at all necessary under all circumstances to render the mixture ready for being pressed by warming. On the contrary, by adjusting the hydrogen ion concentration also at ordinary temperature any desired degree of polymerization assuring the capability of quick hot pressing can be attained at will.

For manufacturing mixtures suitable for molding by die casting the air dried mixture of the solution of the condensation products with fibrous materials is at low temperature, preferably without application of heat, dried down to a low content of water which is just sufficient to secure the flowing of the mixture in the die cast. The term "injection molding" is sometimes used to describe what I mean by die casting.

Example 76 kilograms (1 mol) of thiourea are in a finely powdered state under agitation dissolved in 300 kilograms of an aqueous formaldehyde solution containing 30 per cent by weight (3 mols) of formaldehyde. Then ½ to 1 kilogram of phosphoric acid and 60 kilograms (1 mol) of urea are added to this solution. Now paper strips are in an efficiently working kneading apparatus intimately mixed with the solution. The mixture is thereafter agitated, for instance in a rotating drum, until air-dry, and in order to bring the binding agent in a state of polymerization which is as high as possible, while leaving still such a remainder of water as will assure that the molding powder will flow in the hot press. From these molding compositions homogeneous artificial masses, materials or pressed pieces are made in the usual manner by applying heat and high pressure.

If compositions adapted for die casting are to be made, the air dried mixture is agitated further on at room temperature (20° C.) until only the little amount of water will remain which is just sufficient to secure the flowing of the composition in the die cast.

If in both these cases heat is applied for the purpose of advancing the drying and the polymerization, the mass (molding powder or composition for die casting) may at first be allowed to become dry and thereupon be remoistened in the last stage of warming so that the finished mass contains the small amount of water which secures its thermo-plasticity.

The process may also be carried out by causing preliminarily prepared monomethylol urea or dimethylol urea (or mixtures of these compounds) to take part in the condensation of thiourea and formaldehyde under the above specified conditions. The proportion of formaldehyde has in such case of course to be diminished for the amount belonging to the urea portion.

What I claim is:

1. The process of producing an organic composition suitable for injection-molding or die-casting which comprises reacting 1 mol of thiourea with less than 2 mols of formaldehyde without addition of external heat in an aqueous medium having a hydrogen-ion concentration between $C_H=10^{-5}$ and about $C_H=10^{-3}$ to prevent formation of insoluble thiourea-methylene compounds, mixing a fibrous material with the resulting liquid product and drying the mixture to a point where it is practically dry but still contains enough moisture to be flowable under pressure.

2. The process of producing an organic composition capable of being hardened under the influence of heat and pressure which comprises reacting 1 mol. of thiourea with less than 2 mols of formaldehyde at a temperature not substantially exceeding 20° C. in an aqueous medium having a hydrogen-ion concentration between $C_H=10^{-5}$ and about $C_H=10^{-3}$ to prevent the formation of insoluble thiourea-methylene compounds, mixing a fibrous material with the resulting liquid product and drying the mixture to a point where it is practically dry but still contains enough moisture to be flowable under pressure.

3. The process of producing an organic composition capable of being hardened under the influence of heat and pressure which comprises reacting 1 mol of a mixture of thiourea and urea with less than 2 mols of formaldehyde without addition of external heat in an aqueous medium having a hydrogen-ion concentration between $C_H=10^{-5}$ and about $C_H=10^{-3}$ to prevent formation of insoluble thiourea-methylene compounds, the amount of thiourea contained in the said mixture being sufficient to prevent formation of white insoluble formaldehyde-urea products, mixing a fibrous material with the resulting liquid product and drying the mixture to a point where it is practically dry but still contains enough moisture to be flowable under pressure.

4. The process of producing an organic composition capable of being hardened under the influence of heat and pressure which comprises reacting 1 mol of a mixture of thiourea and urea with less than 2 mols of formaldehyde at a temperature not substantially exceeding 20° C. in an aqueous medium having a hydrogen-ion concentration between $C_H=10^{-5}$ and about $C_H=10^{-3}$ to prevent formation of insoluble thiourea-methylene compounds, the amount of thiourea contained in the said mixture being sufficient to prevent formation of white insoluble formaldehyde-urea products, mixing a fibrous material with the resulting liquid product and drying the mixture to a point where it is practically dry but still contains enough moisture to be flowable under pressure.

5. The process of producing an organic composition capable of being hardened under the influence of heat and pressure which comprises reacting 1 mol of an equimolecular mixture of thiourea and urea with less than 2 mols of formaldehyde without addition of external heat in an aqueous medium having a hydrogen-ion concentration between $C_H=10^{-5}$ and about $C_H=10^{-3}$ to prevent formation of insoluble thiourea-methylene compounds, mixing a fibrous material with the resulting liquid product and drying the mixture to a point where it is practically dry but still contains enough moisture to be flowable under pressure.

6. The process of producing an organic composition capable of being hardened under the influence of heat and pressure which comprises reacting 1 mol of an equimolecular mixture of thiourea and urea with less than 2 mols of formaldehyde at a temperature not substantially exceeding 20° C. in an aqueous medium having a hydrogen-ion concentration between $C_H=10^{-5}$ and about $C_H=10^{-3}$ to prevent formation of insoluble thiourea-methylene compounds, mixing a fibrous material with the resulting liquid product and drying the mixture to a point where it is practically dry but still contains enough moisture to be flowable under pressure.

7. The process of producing an organic composition capable of being hardened under the influence of heat and pressure which comprises reacting 1 mol of a mixture of thiourea and urea with less than 2 mols of formaldehyde without addition of external heat in an aqueous medium having a hydrogen-ion concentration of about $C_H=10^{-3}$, the amount of thiourea contained in the said mixture being sufficient to prevent formation of white insoluble formaldehyde-urea products, mixing a fibrous material with the resulting liquid product, and drying the mixture to a point where it is practically dry but still contains enough moisture to be flowable under pressure.

8. The process of producing an organic composition capable of being hardened under the influence of heat and pressure which comprises reacting 1 mol of a mixture of thiourea and urea with less than 2 mols of formaldehyde at a temperature not substantially exceeding 20° C. in an aqueous medium having a hydrogen-ion concentration of about $C_H=10^{-3}$, the amount of thiourea contained in the said mixture being sufficient to prevent the formation of white insoluble formaldehyde-urea products, mixing a fibrous material with the resulting liquid product and drying the mixture to a point where it is practically dry but still contains enough moisture to be flowable under pressure.

9. The process of producing an organic composition capable of being hardened under the influence of heat and pressure which comprises reacting 1 mol of an equimolecular mixture of thiourea and urea with less than 2 mols of formaldehyde without addition of external heat in an aqueous medium having a hydrogen-ion concentration of about $C_H=10^{-3}$, mixing a fibrous material with the resulting liquid product and drying the mixture to a point where it is practically dry but still contains enough moisture to be flowable under pressure.

10. The process of producing an organic composition capable of being hardened under the influence of heat and pressure which comprises reacting 1 mol of an equimolecular mixture of thiourea and urea with less than 2 mols of formaldehyde at a temperature not substantially exceeding 20° C. in an aqueous medium having a hydrogen-ion concentration of about $C_H=10^{-3}$, mixing a fibrous material with the resulting liquid product and drying the mixture to a point where it is practically dry but still contains enough moisture to be flowable under pressure.

KURT RIPPER.